US006609656B1

(12) United States Patent
Elledge (10) Patent No.: US 6,609,656 B1
(45) Date of Patent: Aug. 26, 2003

(54) METHOD AND SYSTEM FOR IDENTIFYING LOST OR STOLEN DEVICES

(75) Inventor: Dennis D. Elledge, Nampa, ID (US)

(73) Assignee: Micron Technology, Inc., Nampa, ID (US)

( * ) Notice: Subject to any disclaimer, the term of this patent is extended or adjusted under 35 U.S.C. 154(b) by 0 days.

(21) Appl. No.: 09/049,687

(22) Filed: Mar. 27, 1998

(51) Int. Cl.[7] .............................................. G06K 5/00
(52) U.S. Cl. ..................... 235/382; 235/382.5; 235/380
(58) Field of Search ........................... 340/825.54, 572; 235/375, 385, 382, 382.5; 364/478.14; 342/42, 44, 51

(56) References Cited

U.S. PATENT DOCUMENTS

| | | | |
|---|---|---|---|
| 4,284,985 A | | 8/1981 | Heger et al. ................ 340/572 |
| 4,686,514 A | | 8/1987 | Liptak, Jr. et al. .......... 340/571 |
| 4,739,328 A | | 4/1988 | Koelle ......................... 342/44 |
| 4,804,943 A | | 2/1989 | Soleimani .................... 340/539 |
| 5,231,273 A | * | 7/1993 | Caswell et al. .............. 235/385 |
| 5,283,856 A | | 2/1994 | Gross et al. ................... 395/51 |
| 5,310,999 A | * | 5/1994 | Claus et al. ................ 235/384 |
| 5,313,052 A | * | 5/1994 | Watanabe et al. ........... 235/384 |
| 5,317,309 A | * | 5/1994 | Vercellotti et al. ..... 340/825.54 |
| 5,406,261 A | | 4/1995 | Glenn ......................... 340/571 |
| 5,422,930 A | | 6/1995 | McDonald et al. ........... 379/58 |
| 5,448,748 A | | 9/1995 | Yawata et al. ............... 364/500 |
| 5,475,734 A | | 12/1995 | McDonald et al. ........... 379/58 |
| 5,513,126 A | | 4/1996 | Harkins et al. .......... 364/514 A |
| 5,555,426 A | | 9/1996 | Johnson et al. ........ 395/200.15 |
| 5,619,648 A | | 4/1997 | Canale et al. .......... 395/200.01 |
| 5,630,060 A | | 5/1997 | Tang et al. ............. 395/200.01 |
| 5,635,693 A | | 6/1997 | Benson ........................ 235/384 |
| 5,646,592 A | * | 7/1997 | Tuttle ........................... 340/572 |
| 5,675,321 A | | 10/1997 | McBride ....................... 340/568 |
| 5,748,084 A | * | 5/1998 | Isikoff ......................... 340/568 |
| 5,757,271 A | | 5/1998 | Andrews ...................... 340/568 |
| 5,764,892 A | | 6/1998 | Cain et al. ................ 395/200.3 |
| 5,765,033 A | | 6/1998 | Miloslavsky ........... 395/200.36 |

(List continued on next page.)

OTHER PUBLICATIONS

CompuTrace, http://www.computrace.com/about/index.html, printed Mar. 12, 1997 @ 3:40 PM, "Welcome to CompuTrace."

Micron Communications, Inc., Copyright 1997, MSL1026.02.123197, MicroStamp 4000 Interrogator, pp. 1–15.

(List continued on next page.)

Primary Examiner—Karl D. Frech
(74) Attorney, Agent, or Firm—Knobbe, Martens, Olson & Bear, LLP (57) ABSTRACT

A method and system for identifying a lost or stolen device is disclosed herein. The system includes: a transmitter, coupled to said device, for transmitting identification information; a receiver for receiving the identification information transmitted by the transmitter, when the transmitter is within a defined distance from the receiver; and a computer, coupled to the receiver for receiving the information from the receiver, and having a database for storing data associated with lost or stolen devices; wherein the computer compares the information with the data, and generates an alarm if the information indicates that the device is lost or stolen. The method includes: receiving information transmitted by a radio frequency identification (RFID) device, coupled to an item, when the item comes within a defined range of a receiver which receives the information; storing data associated with lost or stolen goods in a database coupled to the receiver; comparing the information to the data and determining if the information matches the data associated with the lost or stolen goods; and generating an alarm, if the information matches the data.

30 Claims, 4 Drawing Sheets

U.S. PATENT DOCUMENTS

| | | | | |
|---|---|---|---|---|
| 5,767,771 A | | 6/1998 | Lamont | 340/571 |
| 5,793,639 A | * | 8/1998 | Yamazaki | 364/478.14 |
| 5,796,948 A | | 8/1998 | Cohen | 395/200.36 |
| 5,802,280 A | | 9/1998 | Cotichini et al. | 395/200.3 |
| 5,805,820 A | | 9/1998 | Bellovin et al. | 395/200.55 |
| 5,896,497 A | | 4/1999 | Halstead | 395/186 |
| 5,912,644 A | * | 6/1999 | Wang | 342/457 |
| 5,920,287 A | * | 7/1999 | Belcher et al. | 342/450 |
| 5,925,103 A | | 7/1999 | Magallanes et al. | 709/230 |
| 5,936,526 A | | 8/1999 | Klein | 340/571 |
| 6,011,473 A | | 1/2000 | Klein | 340/571 |
| 6,031,894 A | | 2/2000 | Fleming, III | 379/44 |
| 6,052,782 A | | 4/2000 | Fleming, III | 713/200 |
| 6,128,739 A | | 10/2000 | Fleming, III | 713/200 |

OTHER PUBLICATIONS

Micron Communications, Inc., How Is RIC Different from RFID? pp. 1–4.

Micron Communications, Inc., Copyright 1997, MSL1028.02.061197, MicroStamp 10.

Micron Communications, Inc., Copyright 1997, MCC at a Glance. The Brains Behind the Stamp.

Micron Communications, Inc., Copyright 1997. Micron Communications Applications. How Many Different Industries Can Use the Microstamp?

Micron Communications, Inc., Copyright 1997. Micron Communications Applications. Airline Applications.

Micron Communications, Inc., Copyright 1997. Micron Communications Applications. Transportation.

Micron Communications, Inc., Copyright 1997. MSL 1033.01.070297.

Micron Communications, Inc., Copyright 1997, MSL1030.02.061097. MicroStamp 20.

Micron Communications, Inc., MicroTag Large Disk Asset Tag Specifications, Model IDT–T–LD.

* cited by examiner

METHOD AND SYSTEM FOR IDENTIFYING LOST OR STOLEN DEVICES

BACKGROUND OF THE INVENTION

1. Field of the Invention

The invention relates to a method and system for retrieving lost or stolen devices. More particularly, the invention relates to a method and system for identifying lost or stolen portable computers as they pass through an airport checkpoint.

2. Discussion of the Related Technology

The theft of portable devices, especially portable electronic devices, continues to be a widespread problem in the United States and world-wide. Each year, millions of dollars worth of electronic equipment such as portable, or laptop, computers are stolen or lost. Typically, when a device is lost or stolen, the owner has no way of retrieving or otherwise locating the device. He or she is then forced to replace the lost item, or make do without it.

Figure 1:
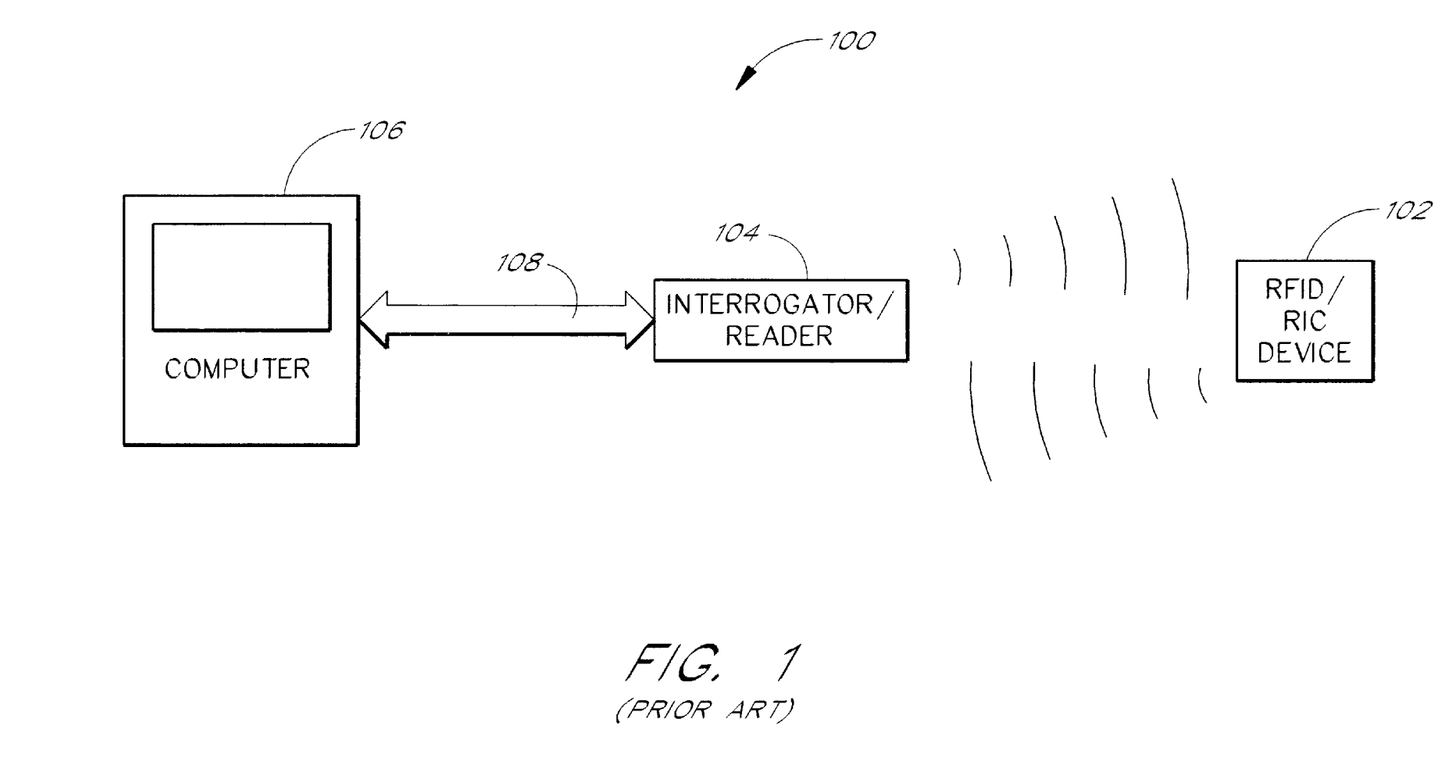
FIG. 1 is a block diagram illustrating a prior art radio frequency identification (RFID) system in which an RFID tag may be identified with a reader device coupled to a computer.

Currently existing technology allows devices to be identified by means of radio frequency identification (RFID) tags. RFID technology uses electromagnetic energy (such as radio) as a medium through which information is sent. Referring to FIG. 1, an RFID system 100 is illustrated. The RFID system 100 includes an RFID tag 102 for transmitting and/or receiving radio frequency signals and a reader 104 for receiving radio frequency signals from the RFID tag 102 and transmitting radio frequency signals to the RFID tag 102. The system 100 also includes a computer 106 which is coupled to the reader 104 by a communications link 108. The communications link 108 may be any one of various types of well-known communication links such as a cable line that directly connects the reader 104 to the computer 106, an Ethernet communications link, or a modem communications link, for example. Through the communications link 108, the reader 104 can receive commands and data from the computer 106 and, thereafter, send data to the remote RFID tag 102. As was noted above, the reader 104 can also receive data from the remote RFID tag 102 and pass the data back to the computer 102.

RFID technology overcomes many limitations of other automatic identification approaches, such as those using bar codes and infrared technology, which use light to communicate. Since an RFID tag 102 does not require a visual scanner, or other vision system, to detect its presence, it may be hidden or invisible to the eye and may also be used in harsh or dirty environments. A reader 104 reads information transmitted by the RFID tag 102 even if the tag 102 is completely hidden from view.

An RFID tag 102 typically includes a receiver and some type of transmitter, an antenna, and memory. There are two categories of RFID tags—active and passive—that represent two different types of RF communication. Tags without batteries are known as passive tags because they derive their power from the RF energy transmitted from a reader. Passive RFID tags tend to be smaller and exhibit short range transmission characteristics (under six feet), whereas battery-powered, active tags, tend to be larger and exhibit long range transmission characteristics (over one hundred feet).

Active tags send data back to the reader with radio power generated from a battery within the tag. Passive tags, on the other hand, use modulated backscatter (MBS) to transmit reflected energy, dictated by the data stream from the tag, back to the reader. Passive tags using MBS are better suited for gate or lane applications where it is undesirable to wake up (see) any tags beyond a certain distance and where there are few obstructions in the energy path.

With the aid of RFID technology, devices which are brought within range of a reader, or interrogator, may be detected. Furthermore, known devices, such as those on assembly lines, can be identified and their progress tracked using this technology. However, there is currently no method or system which provides a mechanism by which it can be determined if the device being detected is lost or stolen. To accomplish this purpose and to be of value, such a system would not only have to identify the device, but be able to determine that it was, in fact, lost or stolen and thereafter, notify appropriate personnel of the matter. Additionally, the reader of such an anti-theft/retrieval system, would best be strategically located so as to make it likely that a significant number of lost or stolen devices would come within range of the reader.

Therefore, what is needed is a method and system of identifying devices, which are randomly brought within range of a reader, determining if the detected devices are lost or stolen and thereafter, notifying appropriate security personnel when such device is located.

SUMMARY OF THE INVENTION

The invention addresses the above and other needs by providing a method and system which utilizes RFID technology to identify lost or stolen goods that randomly come within range of an RFID reader, and thereafter, notifies security personnel of the lost or stolen status of the goods.

In one embodiment of the invention, a system for identifying a lost or stolen device, includes: a transmitter, coupled to the device, for transmitting identification information; a receiver which receives the identification information transmitted by the transmitter, when the transmitter is within a defined distance from the receiver; and a computer, coupled to the receiver so as to receive the information from the receiver, said computer having a first database for storing data associated with lost or stolen devices, wherein said computer compares the information with the stored data, and generates an alarm if the information matches at least some of the stored data.

In another embodiment, a system for identifying a lost or stolen item, includes: a radio frequency identification device, connected to the item, for transmitting information related to the item; a reader which receives the information transmitted by the radio frequency identification device, when the radio frequency identification device is within a defined distance from the reader; and a computer, coupled to the reader so as to receive the information from the reader, said computer having a database for storing a list of lost or stolen items, wherein the computer compares the information with the list of lost or stolen devices, and generates an alarm if the comparison produces a match.

In another embodiment, a system for identifying lost or stolen goods, includes: means for receiving data transmitted by a radio frequency identification device coupled to an item when the item comes within a defined distance of the means for receiving; means for storing a list of lost or stolen goods; means for comparing the data to the list of lost or stolen goods and determining if the data matches information contained in the list of lost or stolen goods; and means for generating an alarm, if the data matches information contained in the list.

In a further embodiment of the invention, a system for identifying a lost or item includes: means for storing identification information in a memory of a radio frequency identification (RFID) device contained within the item, wherein the RFID device transmits the identification information; means for reporting when the item is lost or stolen; means for receiving the identification information transmitted by the RFID device when the item comes within a defined range of the means for receiving; means for storing data associated with lost or stolen items; means for comparing the received identification information to the data associated with the lost or stolen items and for determining if the identification information indicates that the item is lost or stolen; means for generating an alarm, if the identification information indicates the item is lost or stolen, so as to alert personnel of the lost or stolen status of the item; and means for updating the data associated with the lost or stolen items.

In yet another embodiment, the invention is a method of identifying lost or stolen goods, which includes the acts of: receiving information transmitted by a radio frequency identification (RFID) device, coupled to an item, when the item comes within a defined range of a receiver which receives the information; storing data associated with lost or stolen goods in a database coupled to the receiver; comparing the information to the data and determining if the information matches the data associated with the lost or stolen goods; and generating an alarm, if the information matches the data.

In another embodiment, the method of the invention includes: storing identification information in a memory of a radio frequency identification (RFID) device contained within an item, wherein the RFID device transmits the identification information; maintaining a list of lost or stolen items in a database of a computer; receiving the identification information transmitted by the RFID device when the computer comes within a defined range of a receiver, coupled to the computer; comparing the received identification information to the list of lost or stolen items and determining if the identification information indicates that the item is included in the list of lost or stolen items; and generating an alarm, if the identification information indicates the item is lost or stolen.

DETAILED DESCRIPTION OF THE INVENTION

The invention is described in detail below with reference to the figures, wherein like elements are referenced with like numerals throughout.

Figure 2:
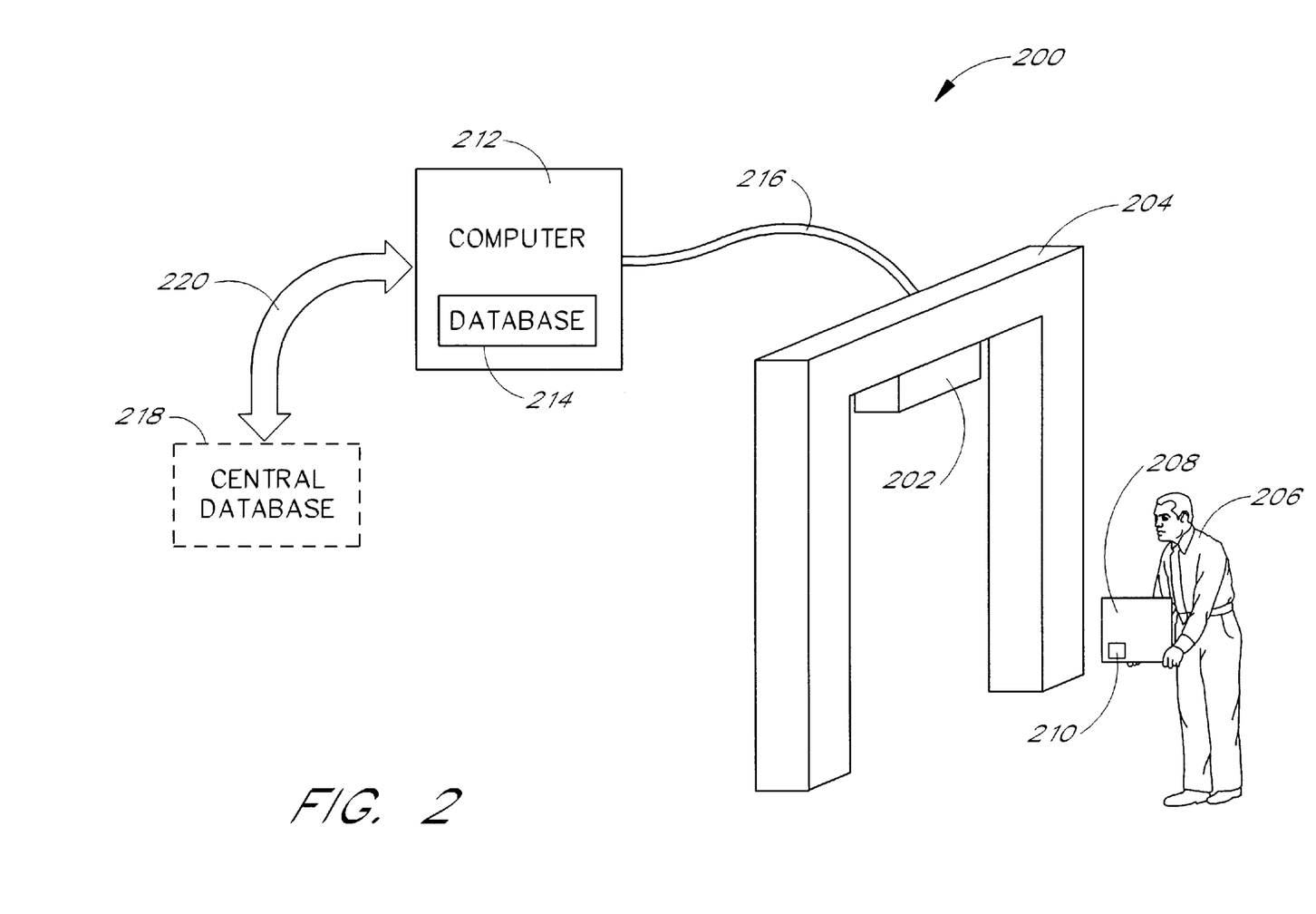
FIG. 2 is a perspective view of an anti-theft/retrieval system in accordance with one embodiment of the invention.

Referring to FIG. 2, an anti-theft/retrieval system 200 is illustrated. The system 200 includes a reader 202 coupled to a corridor 204 through which a person 206 may walk. As shown in FIG. 2, the person 206 is carrying a device 208 having a transmitter 210 embedded therein. The transmitter 210 transmits information related to the device 208 to the reader 202 when the transmitter 210 is within a defined distance from the reader 202. In this way the reader 202 detects the presence of the device 208 and is able to identify it.

In one embodiment, the corridor 204 may be a metal detector such as those typically located in or near an airport terminal. Alternatively, the corridor 204 may be replaced by an x-ray machine, such as those which are typically located next to a metal detector in an airport, which includes a conveyor belt for transporting items placed thereon under an x-ray scanner.

By placing the RFID reader 202 near the metal detector and/or the x-ray machine of an airport checkpoint, the invention provides a security measure against persons trying to board a plane with lost or stolen property. Alternatively, or as an additional security measure, a reader 202 may be positioned near a baggage check-in point such that all baggage being loaded into a plane may be screened for lost or stolen devices. Therefore, by placing readers 202 at strategic checkpoints, within an airport, for example, a radio frequency security net/retrieval system is established which can identify lost/stolen items and assist security personnel stationed near each checkpoint in retrieving the lost/stolen devices. As used herein, the term "checkpoint" refers to any location or point in which people and/or items must pass in order to move on to another location or point.

In the scenario described above, it may be preferable to utilize a transmitter 210, and/or reader 202 with a short transmission/reception range, e.g., six feet, so as to not read transmitters that are far away from the reader 202. Since it is an object of the invention to identify a particular item which has been reported to be lost or stolen, it is counterproductive to receive information from multiple transmitters located in different areas. In such a scenario, one could not be sure which transmitter was transmitting information indicating the presence of a lost or stolen item. In one embodiment, the transmitter 210 is a passive RFID tag.

Coupled to the reader 202 is a computer 212 which receives information from the reader 202 and compares the information to a list of lost and/or stolen devices, stored in a database 214 coupled to the computer 212. Upon comparing the information received from the transmitter 210 to the list of lost and/or stolen devices, the computer 212 determines if there is a match. If there is a match, the computer 212 generates an appropriate alarm signal to notify personnel stationed near the location of the reader 202 and corridor 204 of the status of the device 208 so that appropriate action can be taken. As used herein, the term "list" refers to any format in which data, or information may be stored so as to be retrievable for purposes of review and/or analysis.

In one embodiment, the transmitter 210 may be a standard radio frequency identification (RFID) tag which is well-known in the industry. In another embodiment, the transmitter 210 is a MicroStamp® remote intelligent communications (RIC) device, manufactured by Micron Communications, Inc. Microstamp® is a registered trademark for a family of RIC devices that use active and passive transmitters. However, RIC devices differ from traditional RFID devices in that RIC devices typically have a battery, a microprocessor, a high-frequency radio, more memory and longer range capability when compared to standard RFID devices.

The MicroStamp® RIC device contains a MicroStamp Engine™ integrated circuit (IC), which combines a direct sequence spread spectrum (DSSS) microwave frequency radio, a microcontroller, and a low power static random access memory (SRAM) into a single chip. The MicroStamp Engine IC, when coupled with an antenna and a battery, forms the MicroStamp RIC device. Because the IC combines hundreds of thousands of components on one small chip, the MicroStamp RIC device may be assembled, with a small battery, into very small packages, making it ideal for applications in small handheld, or portable, electronic devices. Although RIC devices are typically more advanced than standard RFID tags, as used herein, the term "radio frequency identification," or "RFID tag", or "RFID device", and any combination or conjugation thereof, refers to both standard RFID devices and RIC devices as described above, as well as any radio frequency transmission device, capable of transmitting data for identification purposes to a receiver.

In one embodiment, the reader 202 is a MicroStamp®4000 RF Interrogator, manufactured by Micron Communications, Inc. The function of this interrogator 202 is twofold: 1) it receives commands and data from the computer 212 and sends data packets to the remote intelligent communications (RIC) unit 210, and 2) it receives reply packets from the RIC unit 210 and passes the reply back to the computer 212. When the interrogator 202 receives a command from the computer 212, the interrogator 202 either executes the command internally, or transmits the command to the RIC unit 210. The RIC unit 210 then executes the command, but may or may not reply, depending on the command's specific function. When the RIC unit 210 replies, the interrogator 202 passes the reply back to the computer 212. This communication protocol between the RIC unit 210, the interrogator 202 and the computer 212 is well-known in the art.

In one embodiment, the computer 212 is directly connected to the reader 202 by the communications link 216, which may be any type of electrical cable having a parallel or serial port connector for interfacing with the external ports of the computer 212, such as an enhanced parallel port (EPP), RS-232, RS-422 or RS-485 communications line, for example. As mentioned above, the communications link 216 may be any type of well-known communications links, or medium, used for transmitting data from one device to another. In one embodiment, The computer 212 may be located near the reader 202 such that security personnel can view a display screen (not shown) of the computer 212 as people pass through the corridor 204 to verify that each person passing through is not carrying an item which has been reported to be lost or stolen. If a person passing through the corridor 204 is carrying a lost or stolen item, the computer 212 should identify the item and, thereafter notify security personnel by displaying a message on its display screen or providing a visual and/or auditory alarm signal.

Alternatively, the computer 212 may be a local computer 212, that is not located near any one reader 202 but, instead, has many readers 202 coupled to it, each reader monitoring a different checkpoint. In this scenario, each reader 202 at each checkpoint requires a means for alerting security personnel stationed at each of the checkpoints. This function can be performed in a number of different ways. For example, an operator monitoring the local computer 212 can call, via telephone, intercom, radio, etc., security personnel located at a particular checkpoint with instructions. Alternatively, the local computer 212 may send an alarm signal to a device located near the particular checkpoint which can provide a visual and/or auditory alarm signal to security personnel stationed at the checkpoint.

As shown in FIG. 2, the anti-theft/retrieval system 200 may further include a central database 218 which is coupled to the local computer 212 by a communications link 220. The communications link 220 may be any one of various well-known communications links or mediums which can be used to transmit data from one device to another. As described in further detail below, a primary function of the central database 218 is to store a master list of lost or stolen devices and periodically update a local list of lost or stolen devices contained within the database 214 of the local computer 212.

Figure 3:
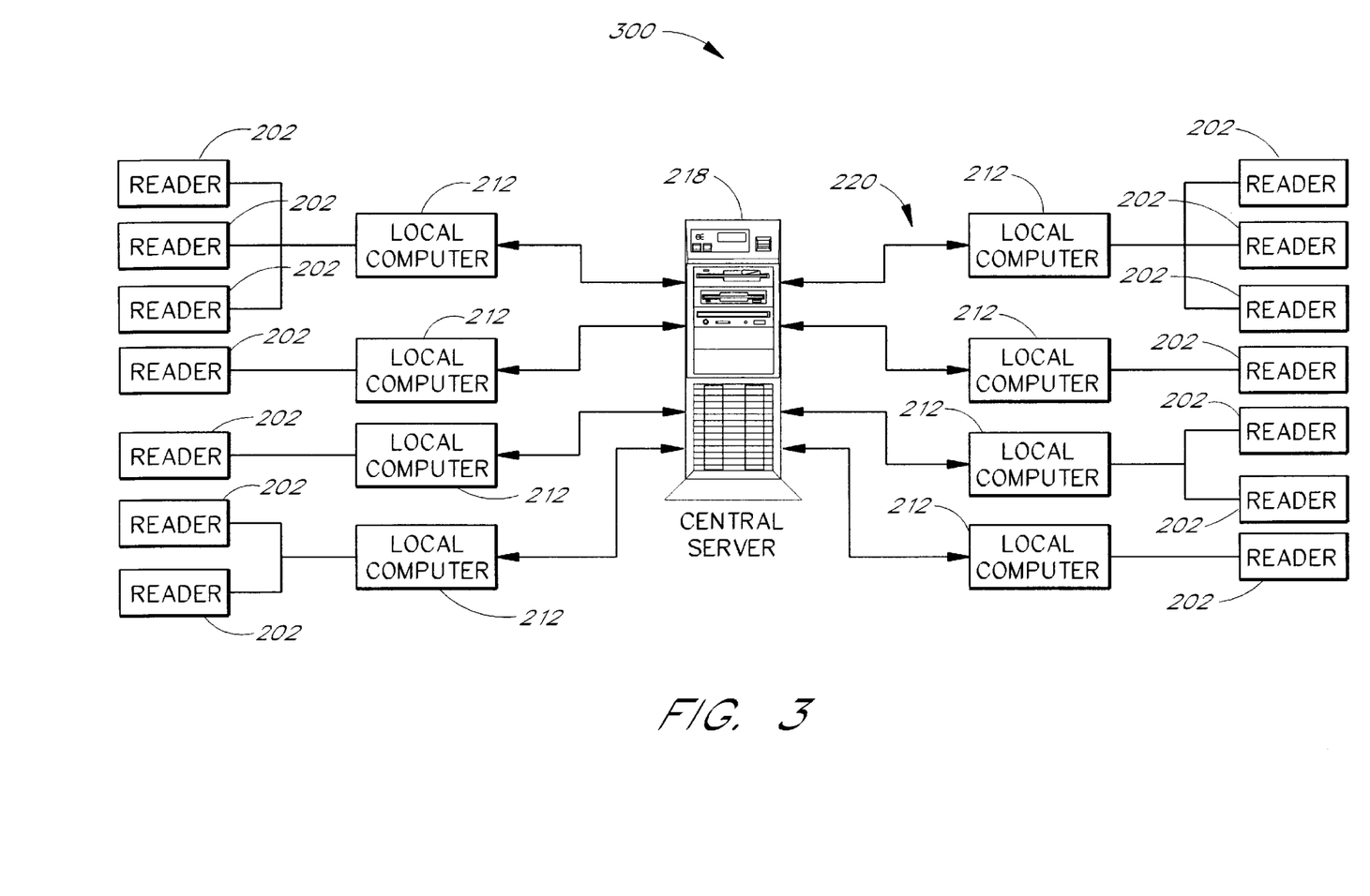
FIG. 3 is a block diagram of a computer network, having multiple readers, for identifying lost or stolen goods, in accordance with one embodiment of the invention.

Referring to FIG. 3, the central database 218 (FIG. 2) may be a computer server 218 which is connected via a computer network 300, to many local computers 212. Each local computer 212 may in turn be interfaced with one or more readers 202, each reader 202 being responsible for monitoring a specified area, or checkpoint, as described above. Any well-known communications protocol, such as the Ethernet communications protocol, may be used to transmit data between each of the multiple local computers 212 and the central server 218. The computer network 300 may be a local area network (LAN), a wide area network (WAN), or alternatively, a part of the global computer information network, otherwise known as the internet.

In order to police for lost or stolen items, a system must be established to report and record lost and stolen items in an efficient and timely manner. For example, after an owner of an item has reported the item to be stolen, its serial number, or other identifying information, should be promptly stored in the central database 218 and provided to each of the local computers 212 to enable them to monitor for the item within a relatively short time after it has been reported to be lost or stolen. Therefore, in one embodiment, the database 214 within the computer 212 is periodically updated with the latest list of lost or stolen goods from the central database 218. The frequency of these updates can be responsive to addition or deletion of an item from the master list stored in the central database 218, or alternatively, the update can occur at predetermined time intervals.

For example, when an owner of a laptop computer discovers that his or her laptop is lost or stolen, the owner can report the missing item to a manufacturer, dealer, or other authorized agent, who can then add the lost/stolen computer to the list of lost/stolen items in the central database 218. The authorized agent may then input the lost/stolen computer's serial number into the central database 218. This serial number is the information, or at least part of the information, which is transmitted by the transmitter 210 (FIG. 2) which is contained in the laptop computer. Additional information transmitted by the transmitter 210 may be the name and address of the registered owner of the laptop computer, for example.

When a person carrying the lost/stolen laptop computer attempts to pass through a checkpoint, represented by corridor 204 in FIG. 2, the reader 202 receives the serial number transmitted by the transmitter 210 and forwards this serial number to the computer 212 for comparison with the list of lost or stolen items. If there is a match, the computer 212 generates an alarm signal which is communicated to proper authorities.

After a lost or stolen laptop computer has been retrieved, its serial number, or other identifying information should be removed from the master list of lost or stolen devices. When local lists are updated by the master list, the retrieved laptop computer will also be removed from all local lists of lost or stolen devices.

For security reasons, the list of lost or stolen goods should only be accessible by authorized personnel. In one embodiment, to add or delete an item from the list of lost or stolen items which is stored in the central database 218, a person must provide a password to verify and authenticate his or her identity. Only after such a password is received and verified can that person obtain access to the central database 218. It is also contemplated that the owner of the laptop computer will be able to personally call a "hotline" telephone number that allows the owner to add the serial number of his or her lost laptop computer to the master list of lost or stolen goods, after passing certain security measures, such as entering a registered password, for example.

Figure 4:
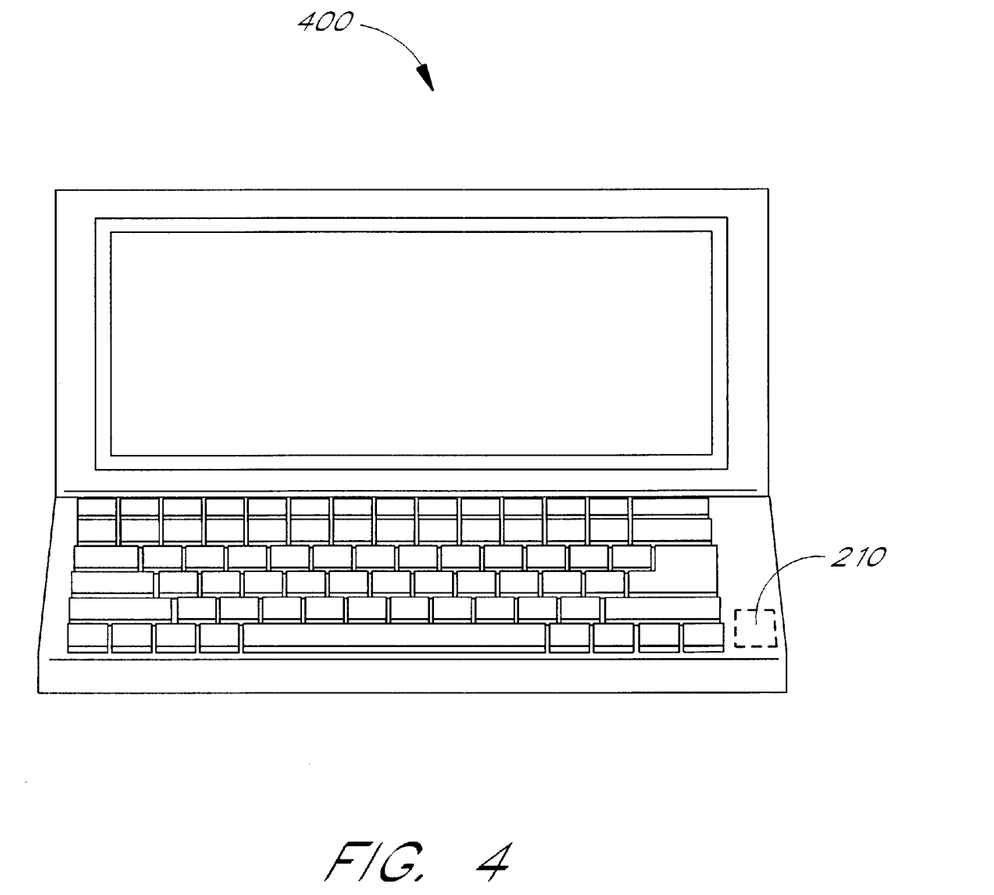
FIG. 4 is a perspective view of a laptop computer having an RFID device embedded within its housing so as to transmit information related to the laptop computer to a receiving device, in accordance with one embodiment of the invention.

Referring to FIG. 4, a perspective view of a portable computer 400 is illustrated. The computer 400 includes a transmitter 210 located within the housing of the computer 400. As mentioned above, the transmitter 210 may be an RFID tag, which is well-known in the art, or a MicroStamp RIC unit, manufactured by Micron Communications, Inc. However, other types of transmitters which are compact in size and capable of transmitting information at desired frequencies and ranges may be utilized in accordance with the invention.

The transmitter 210 should be permanently attached to an internal portion of the computer 400 so as to not be easily accessible. Therefore, a thief would not be able to circumvent the security features provided by the transmitter 210 by simply removing the transmitter 210. In one embodiment, the transmitter 210 is embedded in the housing of the computer 400 during its manufacture. Since typical radio frequency devices are capable of transmitting and receiving data when encapsulated by plastic, or other similar materials, encapsulating the transmitter 210 within a portion of the housing of the computer 400, will not significantly degrade the performance of the transmitter 210.

After the transmitter 210 is programmed with a serial number, or other identifying information, related to the computer 400, the transmitter 210 can transmit this information. In one embodiment, this information may be programmed into the memory of the transmitter 210 by utilizing a designated reader 202 (FIGS. 2 and 3) to transmit the information to the transmitter 210 and store the information in a memory of the transmitter 210. In one embodiment, for security purposes, the designated reader 202 may be required to provide a password which allows it to write to the memory of the transmitter 210, or alternatively, the information transmitted by the reader 202 may be encrypted such that only the transmitter 210 can read and store the information. Such methods of programming RFID/RIC transmitters are well-known in the art. However, any well-known method of programming the transmitter 210 may be utilized in accordance with the invention.

Once the identifying information has been stored in the memory of the transmitter 210, it should be unalterable, except by authorized personnel and/or the registered owner of the item containing the transmitter 210. Any well-known method of ensuring the integrity of the information stored in the transmitter 210, such as password protection and/or encryption schemes, may be utilized in accordance with the invention.

As described above, the invention provides a method and system which utilizes radio frequency technology to identify lost or stolen goods that randomly come within range of a reader capable of receiving information transmitted by a radio frequency transmitter permanently fixed within the lost or stolen goods. After identifying an item which has been reported to be lost or stolen, the method and system notifies designated personnel, as necessary.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A system for identifying a lost or stolen device, comprising:

a first transceiver, comprising a radio frequency transceiver, a microcontroller, and a memory, said first transceiver coupled to a device, and which transmits identification information according to a communications protocol upon receipt by the first transceiver of a signal having a predetermined security parameter associated therewith, the identification information within the first transceiver being secured from unauthorized access thereto;

a second transceiver, capable of recognizing said communications protocol, which transmits the signal having the predetermined security parameter associated therewith and receives the identification information transmitted by the first transceiver, when the first transceiver is within a defined distance from the second transceiver; and a computer, coupled to the second transceiver so as to receive the identification information therefrom, said computer having a first secure database which stores data identifying a plurality of lost or stolen devices and which prevents unauthorized access to the data stored therein, wherein said computer compares the identification information with the stored data, and generates an alarm if the identification information matches at least some of the stored data.

2. The system of claim 1 wherein said second transceiver comprises a spread spectrum transmitter, and said predetermined security parameter is a pseudo-noise (PN) code.

3. The system of claim 1 wherein said second transceiver is located near an airport checkpoint such that as the device is transported through the airport checkpoint, the second transceiver interrogates the first transceiver, said first transceiver authenticates the receiver, and said computer identifies the lost or stolen device and generates said alarm to alert personnel located near the checkpoint.

4. The system of claim 1 wherein said information includes a serial number associated with said device.

5. The system of claim 1 further comprising a central server, coupled to said computer, wherein the central server includes a central database for storing a master list of lost or stolen devices, and wherein the central server communicates with the computer so as to periodically update said first database which stores said data associated with said lost or stolen devices.

6. The system of claim 1, wherein the transmitter and receiver comprise a spread spectrum communication system, and the communications protocol is a direct sequence protocol using a spreading code.

7. The system of claim 1, further comprising a secure link between the first transceiver and a source of the identification information, said source providing the information to the first transceiver prior to transmission of the identification information to the second transceiver.

8. The system of claim 7, wherein the secure link is encrypted.

9. The system of claim 1, wherein the identification information within the first transceiver is password protected.

10. The system of claim 1 wherein said second transceiver comprises a spread spectrum transmitter, and said predetermined security parameter is a frequency hopping sequence.

11. A system for identifying a lost or stolen item, comprising:
- a radio frequency identification device, comprising a radio frequency transceiver, a microcontroller, a battery and a memory, said radio frequency identification device connected to the item so as to frustrate removal therefrom, and which transmits a second signal after decoding a first coded signal received thereby, said second signal having information related to the item associated therewith, the radio frequency identification device being capable of restricting access to the information;
- a reader which transmits the first coded signal and receives the second signal transmitted by the radio frequency identification device when the radio frequency identification device is within a defined distance from the reader, the reader further extracting the information related to the item from the received second signal; and
- a computer, coupled to the reader so as to receive the information related to the item from the reader, said computer having a secure database with restricted access for storing a list identifying a plurality of lost or stolen items, wherein the computer compares the information with the list of lost or stolen devices, and generates an alarm if the comparison produces a match.

12. The system of claim 11 wherein said authenticating said first signal comprises decoding said first signal using a pseudo-noise (PN) code.

13. The system of claim 12 further comprising a central server, coupled to said computer, wherein the central server includes a central database for storing a master list of lost or stolen items, and wherein the central server communicates with the computer so as to periodically update said list of lost or stolen items stored in said database of the computer.

14. A system for identifying lost or stolen goods, comprising:
- a radio frequency identification device coupled to an item, the radio frequency identification device including identification information, the device further including:
- means for restricting access to the identification information;
- means for supplying power to the device independent of the item to which the device is coupled;
- means for transmitting an interrogation signal to the radio frequency identification device;
- means, associated with the radio frequency identification device, for authenticating the interrogation signal independent of the operation of the item;
- means for transmitting the identification information upon proper authentication of the interrogation signal, with said means for transmitting the identification information independent of the item to which the device is coupled;
- means for securely receiving the identification information transmitted by the means for transmitting the identification information when the item comes within a defined distance of the means for securely receiving;
- means for storing a list identifying a plurality of lost or stolen goods, the means for storing including means for restricting access to the list of lost or stolen goods to prevent tampering therewith;
- means for comparing the identification information to the list of lost or stolen goods and determining if the identification information matches information contained in the list of lost or stolen goods; and
- means for generating an alarm at the means for securely receiving, if the identification information matches the information contained in the list.

15. The system of claim 14 further comprising:
- means for reporting when said item is lost or stolen; and
- means for updating said list of lost or stolen goods so as to include the item in the list.

16. The system of claim 15 wherein:
- said means for reporting includes means for entering identification information related to said item into a central database of a central server; and
- said means for updating includes means for communicating between the central server and a local computer, coupled to said means for receiving, wherein said list of lost or stolen goods is stored within a local database of the local computer and the identification information contained within the central database is transmitted and stored in the local database so as to update the list stored in the local database.

17. The system of claim 14, further comprising means for securely transferring said identification information to the radio frequency identification device, and means for storing the transferred identification information in a memory of said radio frequency identification device, wherein the means for securely transferring comprises a spread spectrum transmitter and receiver.

18. The system of claim 14 wherein said means for generating an alarm comprises means for displaying a message on a display screen so as to alert personnel stationed near the display screen of a lost or stolen status of said item.

19. The system of claim 14 wherein said means for generating an alarm signal comprises means for generating an auditory signal which alerts personnel stationed near said receiving means of a lost or stolen status of said item.

20. A method of identifying lost or stolen goods, comprising:
- storing information within a radio frequency identification (RFID) device coupled to an item, said device being capable of restricting access to said information, said device being a self-contained package independent of said item, and comprising a radio frequency transceiver, a microcontroller, a power source and a memory;
- transmitting an encoded interrogation signal to said RFID device when the item comes within a defined range of a receiver;
- decoding said encoded interrogation signal;
- transmitting said information according to a predetermined communications protocol when said encoded interrogation signal has been decoded;
- receiving said information transmitted by said RFID device;
- storing data identifying a plurality of lost or stolen goods in a database coupled to the receiver, said database having restricted access so as to prevent tampering with said data;
- comparing the information to the data and determining if the information matches the data identifying the plurality of lost or stolen goods; and
- generating an alarm at the receiving end of the information transmitted by said RFID device, if the information matches the data.

21. The method of claim 20 further comprising:

reporting when said item is lost or stolen; and updating said data identifying said lost or stolen goods so as to indicate a lost or stolen status of said item.

22. The method of claim 21 wherein:

said act of reporting includes entering identification information related to said item into a central database of a central server; and said act of updating includes transmitting data between the central server and a computer, coupled to said receiver, wherein said data identifying said lost or stolen goods is stored within a database of the computer and said identification information contained within the central database is transmitted and stored in the database of the computer so as to update the database.

23. The method of claim 22 wherein the act of storing said information in said RFID device comprises transmitting said information from said receiver to said RFID device using a secure communications link when the device is within a defined distance from said receiver.

24. The method of claim 20 wherein said act of generating an alarm comprises displaying a message on a display screen so as to inform personnel stationed near the display screen of a lost or stolen status of said item.

25. The method of claim 20 wherein said act of generating an alarm comprises generating an auditory signal which informs personnel stationed near said receiving means of a lost or stolen status of said item.

26. A method of identifying lost or stolen items, comprising:

securely storing identification information in a memory of a radio frequency identification (RFID) device contained within an item and comprising a radio frequency transceiver, a microcontroller, a battery and a memory, said RFID device being securely disposed within said item so as to frustrate unauthorized removal thereof and said device comprising a self-contained package independent of said item;

transmitting an interrogation signal to said RFID device;

authenticating said interrogation signal;

transmitting said identification information from said RFID device upon authentication of said interrogation signal;

maintaining a list identifying a plurality of lost or stolen items in a secure database of a computer, said database having security features associated therewith so as to prevent unauthorized access to said list of lost or stolen items;

receiving the identification information transmitted by the RFID device;

transferring the received identification information to said computer;

comparing the received identification information to the list of lost or stolen items and determining if the identification information indicates that the item is included in the list of lost or stolen items; and generating an alarm, if the identification information indicates the item is lost or stolen.

27. The method of claim 26 further comprising:

reporting when said item is lost or stolen; and updating said list of lost or stolen items so as to include said item in the list.

28. The method of claim 27 wherein said item is a computer.

29. The method of claim 26 wherein:

said act of securely storing identification information includes restricting access to said information contained within said RFID device using at least one security measure;

said act of reporting includes entering said identification information into a central database of a central server; and said act of updating includes transmitting said identification information contained within said central database to said database of said computer so as to update said list stored in the database of the computer to include said item.

30. A system for identifying a lost or stolen device, comprising:

a first transceiver, comprising a radio frequency transceiver, a microcontroller, and a memory, said first transceiver coupled to the device, and which transmits identification information according to a communications protocol upon receipt by the first transceiver of a signal having a predetermined security parameter associated therewith, the identification information within the first transceiver being secured from unauthorized access thereto;

a second transceiver, capable of recognizing said communications protocol, which transmits the signal having the predetermined security parameter associated therewith and receives the identification information transmitted by the first transceiver, when the first transceiver is within a defined distance from the second transceiver;

a first secure database configured to store data identifying a plurality of lost or stolen devices and which prevents unauthorized access to the data stored therein;

a computer, directly coupled to the second transceiver so as to receive the identification information therefrom, said computer further coupled to said first secure database so as to receive the stored data, wherein said computer compares the identification information with the stored data, and generates an alarm if the identification information matches at least some of the stored data; and a central server, coupled to said computer, wherein the central server includes a central database for storing a master list of lost or stolen devices, and wherein the central server communicates with the computer so as to periodically update said first database which stores said data associated with said lost or stolen devices.

* * * * *